United States Patent [19]

Southern et al.

[11] Patent Number: 5,606,951

[45] Date of Patent: Mar. 4, 1997

[54] ENGINE AIR SUPPLY SYSTEMS

[75] Inventors: Michael P. Southern, Wembley; Keith Melbourne, Subiaco; Ian R. Thompson, Duncraig, all of Australia

[73] Assignee: Orbital Engine Company (Australia) Pty. Limited, Balcatta, Australia

[21] Appl. No.: 549,766

[22] PCT Filed: Jun. 29, 1994

[86] PCT No.: PCT/AU94/00360

§ 371 Date: Nov. 30, 1995

§ 102(e) Date: Nov. 30, 1995

[87] PCT Pub. No.: WO95/01502

PCT Pub. Date: Jan. 12, 1995

[30] Foreign Application Priority Data

Jun. 30, 1993 [AU] Australia .................................. 9714

[51] Int. Cl.[6] .............................. F02D 9/10; F02D 11/10; F02D 41/18

[52] U.S. Cl. ............................................. 123/399; 123/586

[58] Field of Search ................................... 123/361, 399, 123/403, 585, 586

[56] References Cited

U.S. PATENT DOCUMENTS

| | | | |
|---|---|---|---|
| 4,473,052 | 9/1984 | Kamiyama et al. | 123/399 |
| 4,524,745 | 6/1985 | Tominari et al. | 123/399 |
| 4,549,517 | 10/1985 | Kamiyama | 123/399 |
| 4,763,264 | 8/1988 | Okuno et al. | 123/399 |
| 4,765,296 | 8/1988 | Ishikawa et al. | 123/399 |
| 5,080,064 | 1/1992 | Buslepp et al. | 123/399 |
| 5,349,932 | 9/1994 | Boverie et al. | 123/399 |
| 5,406,920 | 4/1995 | Murata et al. | 123/399 |
| 5,526,787 | 6/1996 | Pallett | 123/399 |

FOREIGN PATENT DOCUMENTS

66831/81 9/1982 Australia .
4313933 11/1993 Germany .

OTHER PUBLICATIONS

Patent Abstracts of Japan, M454, p. 111, JP,A,60–192852, Oct. 1985.

Primary Examiner—Willis R. Wolfe
Attorney, Agent, or Firm—Nikaido, Marmelstein, Murray & Oram LLP

[57] ABSTRACT

Disclosed is a method of controlling the air supply to an internal combustion engine having a means to throttle the air flow to the engine comprising determining the air demand in response to a driver initiated signal; determining an initial position of the throttle means in response to the driver initiated signal; determining the actual rate of air supply and comparing the actual rate of air supply with the determined air demand; moving the throttle means to the initial position, the position of the throttle means being adjusted to bring the actual air supply within acceptable operating limits of the determined air demand.

24 Claims, 3 Drawing Sheets

ENGINE AIR SUPPLY SYSTEMS

This invention relates to the control of air flow to an internal combustion engine to enable efficient and controlled combustion of fuel supplied to the engine.

In a Drive-By-Wire (DBW) system, the driver has no direct mechanical control over either the fuel supply or air supply to an engine. Rather, the accelerator pedal, or throttle control, operated by the driver is typically utilised to set the position of a throttle valve of the engine induction system. The positioning of the throttle valve in turn provides a consequential air flow to the engine. This type of DBW system is commonly known in the field of four-stroke engine technology.

Other more advanced DBW systems may utilise the driver operated accelerator pedal, or throttle control, to generate a "demand" signal which is processed by an Electronic Control Unit (ECU) to provide the required air and/or fuel supply to the engine. Such a DBW system may be implemented in either an air based or fuel based system if desired.

For example, in a fuel based system wherein the fuelling rate is the primary control parameter, engine load control is accomplished by controlling the amount of fuel delivered to the engine. The operator demand signal is converted into a signal which represents the required or demanded fuelling rate for the engine. From this demanded fuelling rate, together with other engine operating parameters, the required or demanded air flow for the engine is determined and a throttle valve, normally electrically actuated, is controlled to enable the supply of this demanded air flow. Movement of the throttle valve may be accomplished by, for example, a stepper motor or a position feed-back controller acting on the throttle valve actuator.

In order to provide the demanded air flow, the throttle valve must be controlled or actuated such that it moves to a position corresponding to the demanded air flow. This may be accomplished by, for example, a feed-back control circuit which compares the actual air flow rate and the required or demanded air flow rate and then adjusts the throttle position accordingly. That is, the actual air flow as measured in the engine induction system is used to effect any adjustment to the position of the throttle valve until the demanded air flow is achieved. An example of such a fuel based DBW system is disclosed in Mikuni Kogyo Co Ltd's Australian Patent Application No. 66831/81.

However, it will be appreciated that the above described control strategy is not entirely satisfactory as it will suffer from a time lag in response because the throttle movement is dependent upon control signals which are the result of successive comparisons between the demanded air flow and the actual air flow of the engine as measured in the induction system. That is, the throttle valve is moved or driven to a certain position in response to the measured or actual air flow rate being compared with the demanded air flow rate. Hence, the control strategy requires to determine an error in the comparison between the actual air flow rate and the demanded air flow rate before the throttle is moved or actuated and numerous individual feed-back routines will typically be required before the throttle value reaches a position acceptably close to the required throttle position which corresponds to the demanded air flow. This causes a lag. Typically, this lag will be further compounded by the fact that the air flow will not instantaneously change with changes in throttle position. This overall lag in the response time has detrimental effects upon air/fuel ratio control.

The present invention is aimed at providing a method of operating an engine wherein the above described problem is overcome or substantially reduced.

With this object in view, the present invention provides a method of controlling the air supply to an internal combustion engine having a means to throttle the air flow to the engine comprising:
determining the air demand in response to a driver initiated signal;
determining an initial position of the throttle means in response to the driver initiated signal;
determining the actual rate of air supply to the engine and comparing the actual rate of air supply with the determined air demand;
moving the throttle means to the initial position; and
adjusting the position of the throttle means to bring the actual rate of air supply within acceptable operating limits of the determined air demand.

As is evident, such a method not only comprises a "feed-back" type air control loop, but also a "feed-forward" type control loop. Essentially, an initial feed-forward "coarse" setting for the throttle position is determined from the driver initiated signal and the throttle means is driven to this coarse setting. "Fine tuning" of the throttle means position is then effected by way of the feed-back air supply comparison or correction step of the method to provide a more accurate position setting of the throttle means. Typically, the feed-forward loop is much faster acting than the feed-back loop. Further, it is to be noted that both control loops may be made to provide for the positioning of the throttle means simultaneously, or the feed-back loop may be effected once the feed-forward loop has resulted in the initial positioning of the throttle means.

In addition, the method may include the operation of a feed-back throttle position control loop wherein the actual position of the throttle means is compared with a set point position value and a throttle position actuator is actuated when a measured throttle means position value differs from the set point position value by a greater than acceptable margin to bring the measured or actual position and the set point value into closer alignment.

A preferred embodiment of the invention comprises an "adaptive" control strategy which periodically updates a look-up map provided with particular throttle positions for various engine operating conditions. That is, the initial position of the throttle means determined from a look-up map in response to driver initiated signals and other engine operating conditions may be periodically re-defined through an iterative procedure so as to more accurately provide a throttle position which will provide the demand air flow. This can be achieved in a relatively simple manner by determining the difference between the final throttle position, which supplies the demand air flow, and the initial coarse setting of the throttle position. This difference represents the amount of correction made to the initial throttle position and can be periodically used to update the values within the throttle position look-up map or be used as a correction factor for this look-up map. In this way, a more accurate set of throttle position values are defined over time and in accordance with the engine operating history which enables the number of necessary iterations to achieve the final throttle position to be reduced. This enhancement enables better response to operator demand changes.

The present invention is conveniently implemented in an internal combustion engine control system comprising:
at least one air intake passage through which air flows to the engine;
first control means located in the at least one air intake passage and being operable to vary the rate of air flow through the at least one air intake passage;

measurement means for determining an actual rate of air flow through said at least one air intake passage; and second control means operable to determine an air and/or fuel requirement of the engine in response to a driver initiated signal;

characterised in that said second control means also determines an initial setting for said first control means upon determination of the air and/or fuel requirement of the engine; the actual rate of air flow is measured by said measurement means and compared with the determined air requirement, the setting of said first control means being controlled by the second control means such that the actual rate of air flow is adjusted to within acceptable operating limits of the determined air requirement.

Conveniently, the first control means is a throttle valve and values of throttle position for a particular operator demand, for example, pedal position, and for various engine operating conditions are stored in a look-up map within an Electronic Control Unit (ECU). These values of throttle position are ideally set to provide a best approximation of the demand air flow in the air intake passage for a given operator demand. This enables a more rapid response in terms of the air flow obtained in the air intake passage, to a particular operator demand. This coarse or feed-forward position setting, which is a first approximation to the required throttle position necessary to provide the demanded air flow, results in a particular air flow within the air intake passage. This particular or actual air flow is compared with the required or demanded air flow determined by the second control means. Then, if necessary, the throttle position is trimmed or adjusted to provide a further approximation to the demanded air requirement. This iterative feed-back process continues until the measured or actual air flow within the air intake passage meets the demanded air requirement for a given driver initiated signal. It should, however, be noted that this iterative feed-back process may be taking place whilst the throttle is being moved to the first approximation coarse position setting. The iterative feed-back process may occur in one, or a combination, of two forms, that is a feed-back loop on throttle position and a feed-back loop based on a comparison of actual air flow with demanded air flow.

The second control means is conveniently an ECU which controls the overall engine management system. The driver demand is conveniently generated as a function of accelerator pedal position and the corresponding throttle position values relate to a particular pedal position. Advantageously, however, the throttle position valves are not merely related to the accelerator pedal position but are compensated for engine to engine variations and engine operating conditions.

The invention may also be conveniently implemented in the engine air supply system disclosed in the applicant's co-pending Australian Patent Application No. 51065/90. Such a system has two air intake passages, one of which is provided with a driver actuated mechanism to control air intake and the other of which is provided with an actuator means to control air intake which is operable under the control of an ECU in response to sensed engine operating conditions. The latter actuator means is that which would be operated in accordance with the first control means of the present invention. In such a system, the latter actuator mechanism would preferably be provided with some form of position sensor means such that the position of the actuator within the second air intake passage is able to be determined by the ECU.

In a third aspect, the invention provides a method of diagnosing faults in an engine air intake system comprising:

at least one air intake passage through which air flows to the engine;

first control means located in said at least one air intake passage and being operable to vary the rate of air flow through said at least one air intake passage; and second control means operable to determine an air and/or fuel requirement of the engine in response to a driver initiated signal;

wherein said second control means also determines an initial setting for said first control means upon determination of the air and/or fuel requirement of the engine;

said actual rate of air flow is measured by said measurement means and compared with said determined air requirement, the setting of said first control means being controlled by the second control means such that said actual rate of air flow is adjusted to within acceptable operating limits of the determined air requirement characterised in that the initial setting is updated in accordance with the engine operating history and stored within a look-up table, the updated setting in said look-up table being compared with the initial setting to determine the occurrence of faults within the engine air intake system.

This aspect may be implemented in the following manner. When engine look-up maps are created, the initial throttle position setting is typically characterised with respect to engine speed and load as well as for various other factors such as atmospheric temperature and pressure. As the look-up map is updated over time, on the basis of the value of the corresponding final position after an initial position setting has been set, the values for the initial settings are modified such that they approach or better approximate the values that the final settings are likely to achieve. Comparison of the actual or measured values with these expected values yield information about the occurrence of faults in the engine.

For example, a position setting that is outside the expected range may indicate excessive or insufficient air flow. This information may suggest the presence of a leak or blockage, respectively, in the air induction system of the engine.

Further, such a fault detection system may take account of engine operating conditions such as temperature and pressure. For example, in high altitude regions, drivers may encounter a decrease in pressure which will require the throttle to be opened wider to obtain the same rate of air flow for a given engine load and speed than would be required at a lower altitude.

Upon diagnosis of such a fault or adverse operating condition, the engine may still be operated in a mode wherein the initial throttle position is set in response to the driver initiated signal and adjusted in accordance with a feed-back or throttle position. That is, the actual throttle position is compared with the valve tabulated in a look-up map applicable to the particular air and/or fuel requirement of the engine and adjusted such that difference or error in position is minimised.

The invention will be better understood from the following description of one practical arrangement of the air supply control system as illustrated in the accompanying drawings.

Figure 1:
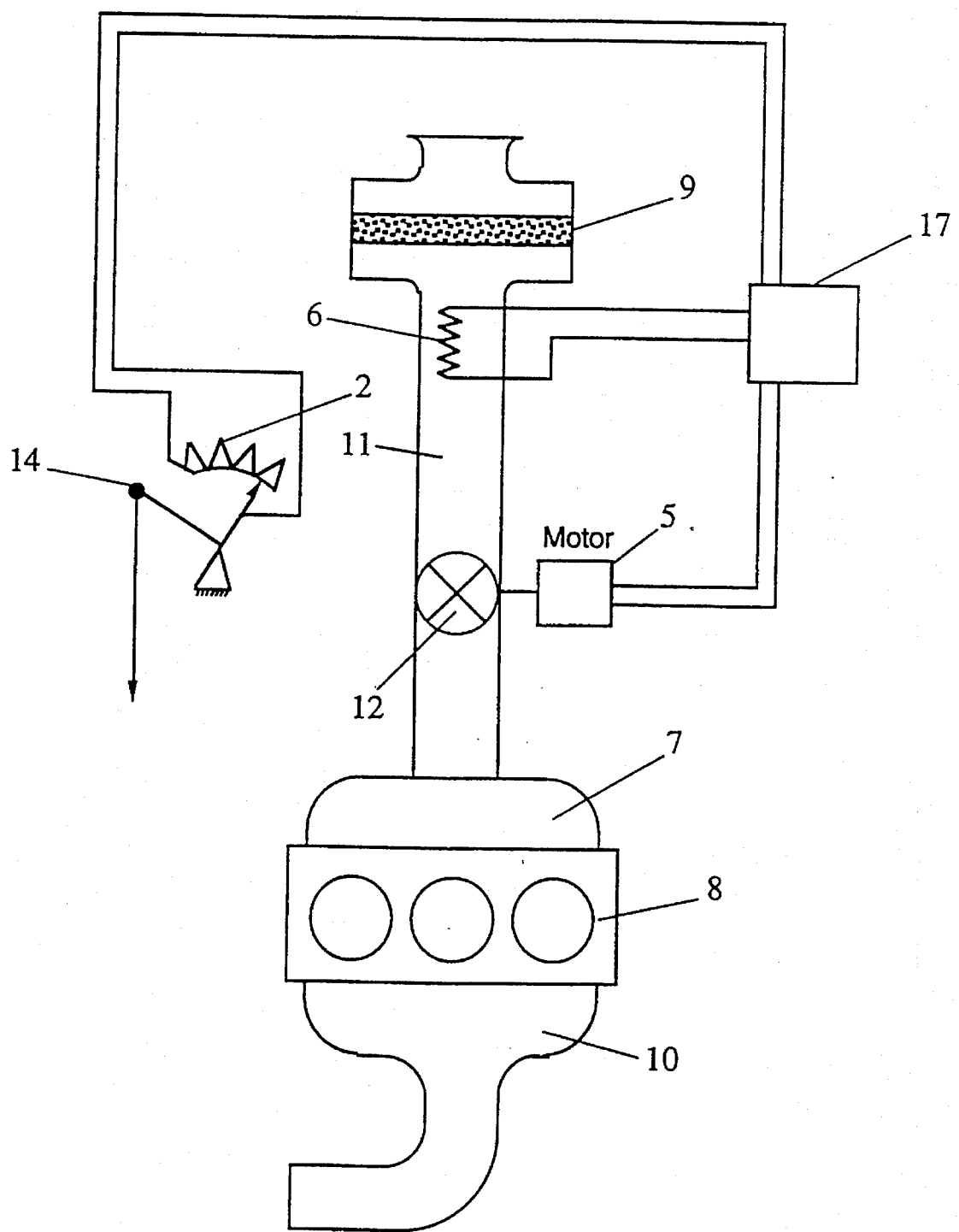
FIG. 1 is a diagrammatic layout of a first embodiment of the air induction system and the control thereof.

Referring now to FIG. 1 of the drawings, the three cylinder engine 8 includes an air intake manifold 7 and an exhaust manifold 10. The intake manifold 7 is in communication with an air intake passage 11 which receives air through a conventional air filter box 9. Mounted in the air intake passage 11 is a motor controlled throttle valve 12. An air flow sensor 6 is provided in the air intake passage 11 on the upstream side of the throttle valve 12. The air flow sensor 6 senses the actual rate of air supply to the engine 8 through the air intake passage 11.

In operation, as the driver actuates the accelerator pedal 14 from an idle position, the potentiometer 2 will provide a signal to the Electronic Control Unit (ECU) 17 indicating the load demand of the engine 8. The ECU 17, which is provided with an appropriate look-up map, will determine therefrom the fuelling rate required by the engine 8 and the necessary air flow into the engine 8 to achieve the desired air/fuel ratio in the combustion chambers thereof. In addition, the ECU 17 determines an initial position for the throttle valve 12. This initial position is determined from an appropriate throttle position look-up map which contains values therein giving a best approximation to the required throttle position which will give the demanded air flow to the engine. That is, this look-up map provides a "coarse" feed-forward position setting for the throttle valve 12. The ECU 17 also receives appropriate signals from a throttle position feed-back loop which indicates whether the throttle valve 12 is positioned within certain predetermined limits of the desired position setting therefor.

The ECU 17 issues an appropriate signal to actuate the throttle valve servo motor 5 to position the throttle valve 12 in the position determined so that the required amount of air will flow through the air intake passage 11 to the air intake manifold 7. Trimming control of the position of the throttle valve 12 is provided in accordance with the air flow measured by the air flow sensor 6. The actual air flow through the air intake passage 11 is compared against the demanded air flow as determined by the ECU 17 and the throttle valve 12 is adjusted by the servo motor 5 as necessary. That is, the initial position setting is trimmed by this feed-back arrangement to fine tune the position of the throttle valve 12. It should also be noted that this feed-back on the actual air flow through the air intake passage 11 also occurs whilst the throttle valve 12 is being driven to its initial position by the servo motor 5.

Once the throttle position has been set to the position that provides the demand air flow to the engine, the error in throttle position and demand air flow is acceptably small and therefore the throttle control system remains in a passive mode until a different driver initiated signal is received by the ECU, for example, as a consequence of the driver changing the accelerator pedal position.

Figure 2:
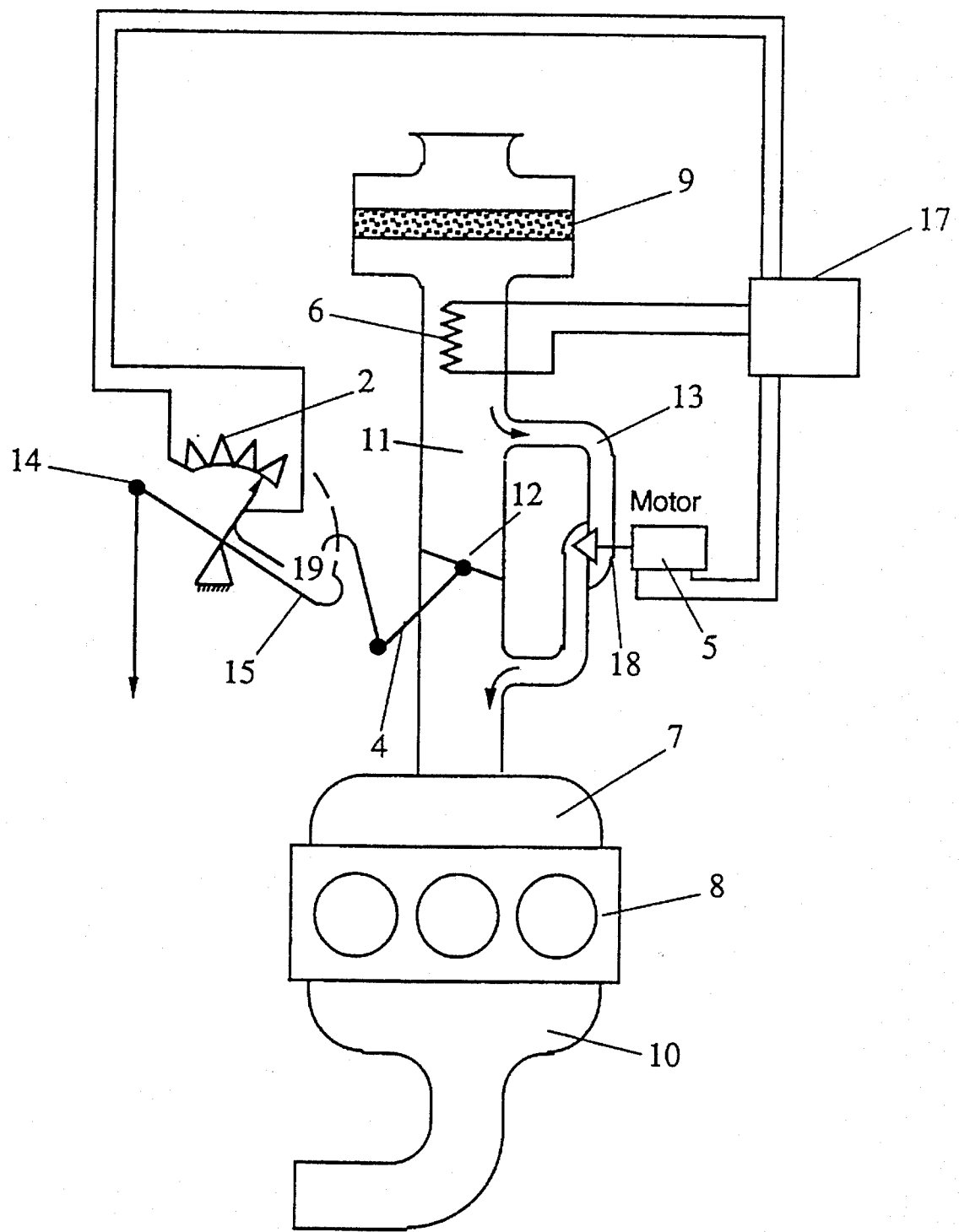
FIG. 2 is a diagrammatic layout of a second embodiment of the air induction system and the control thereof.

In a second embodiment, as shown in FIG. 2, there is provided a second air intake or bypass passage 13 which communicates with the primary air intake passage 11 both upstream and downstream of the throttle valve 12 so that air can flow to the engine 8 even when the throttle valve 12 is in the closed position. Incorporated in the bypass passage 13 is a motor operated flow control valve 18. The flow control valve 18 is provided with appropriate position feed-back control means thereon.

In this case, for a majority of the engine operating range, the driver controls the initial position of throttle valve 12 through a linkage 15 to the accelerator pedal 14 which is coupled with an arm 4 associated with the throttle valve 12. Typically, at low loads, the throttle valve 12 is mostly closed and air flow to the engine 8 is principally through the bypass passage 13 under the control of the flow control valve 18. This is also generally the case under idle conditions. In this connection, a lost motion arrangement may be provided in association with the linkage 15 as shown at 19, wherein at low loads, movement of the accelerator pedal 14 will not in fact result in movement of the throttle valve 12. At medium and high operating loads, the air flow to the engine 8 is principally controlled by the throttle valve 12. However, the valve 18 may function to trim or provide a correction to the air flow to the engine 8.

In one arrangement, the ECU 17, as discussed with reference to the first embodiment, can be adapted to determine an initial coarse position setting for the flow control valve 18 and then trim the position thereof to accurately provide the demanded air flow to the engine 8, particularly at low load. Alternatively, the valves 12 and 18 may both be ECU controlled such that they may both be set to an initial position in accordance with a particular pedal position and thereafter "fine-tuned" to deliver the demanded air flow to the engine 8. Appropriate look-up maps may be provided to supply appropriate position value for an array of different engine operating conditions.

Figure 3:
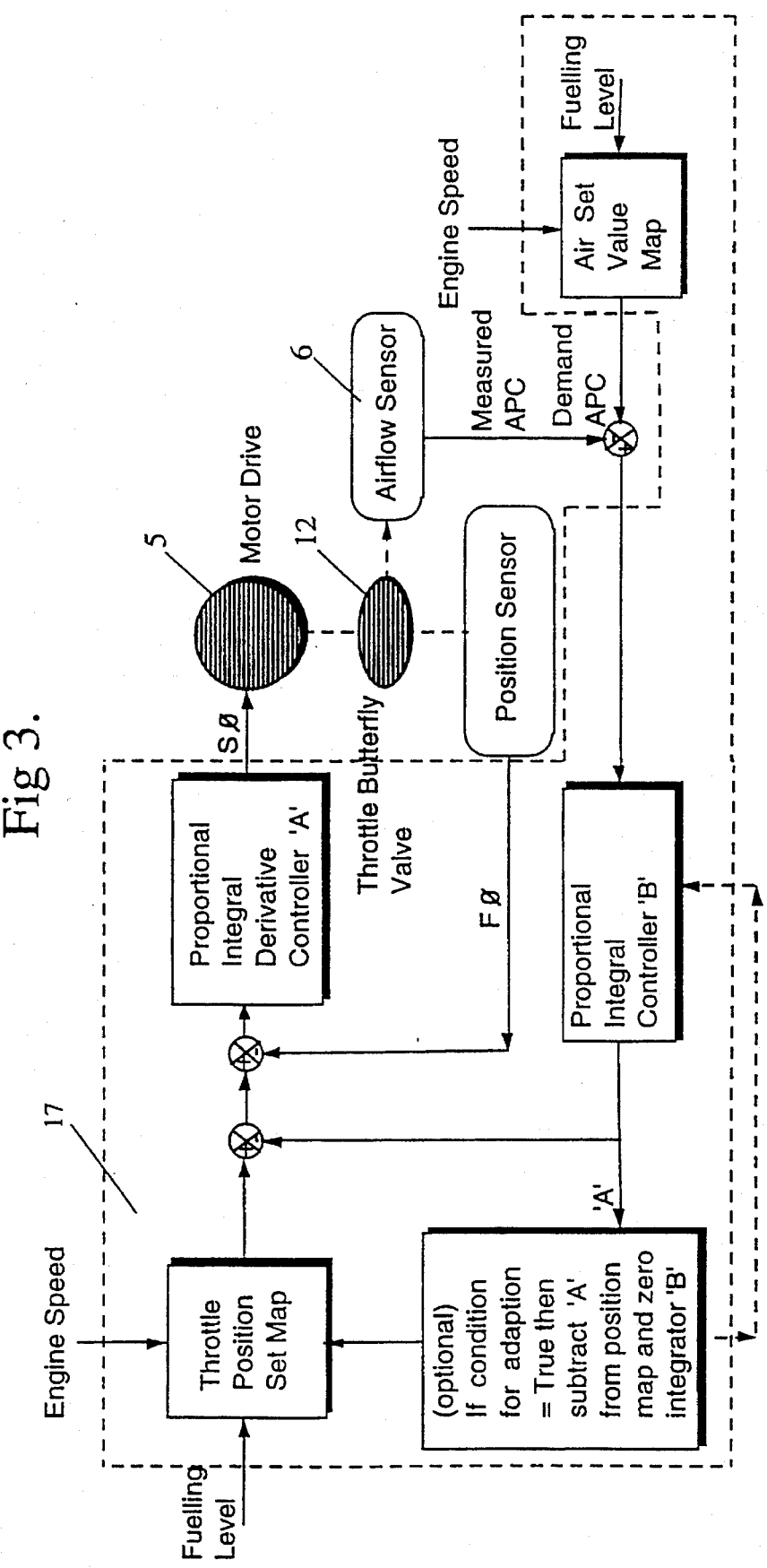
FIG. 3 is a schematic layout of a control system according to the present invention.

Referring now to FIG. 3, the operation of the control system is described. In accordance with accelerator pedal position and engine operating parameters such as engine speed, the ECU 17 generates an initial coarse setting $S\theta$ for the throttle position. Conveniently, the generated throttle position $S\theta$ is determined by a look-up map which contains values of throttle position as a direct or indirect function of pedal position and engine speed. The ECU 17 also generates the required fuel per cycle (FPC) and corresponding demand air per cycle (APC) for the engine. The desired setting $S\theta$ of the throttle valve 12 is compared against the actual position thereof by way of a throttle valve position feed-back loop. The difference or the error $F\theta$ between these two values is input to the ECU 17 which adjusts the throttle valve position accordingly. This is a fairly fast acting feed-back loop which operates simultaneously with the other feed-back and feed-forward loops of the control system.

As will be discussed further hereinafter, the values of $S\theta$ may be updated or modified in accordance with engine to engine variations and/or in accordance with a history of engine operation. For example, in previous engine operation, a certain load and speed may have ultimately required the throttle valve to be set at an angle $S\theta_1$ wherein the initial coarse setting thereof was at an angle $S\theta$. Accordingly, the throttle position set map may be periodically updated such that, at the next occurrence of this engine load and speed operating point for the same operating conditions, the throttle is initially moved to $S\theta_1$ and not $S\theta$.

Alternatively, such data from the engine operating history may be used to update or modify a separate throttle position correction map, which in conjunction with the throttle position set map determines $S\theta$ for the throttle valve 12. Either of these systems can also be made dependent upon other parameters such as atmospheric temperature and pressure. In this manner, the method of controlling the air supply to the engine is adaptive and may compensate for changes during the life of the engine.

The actual air flow generated in air intake passage 11 is then measured by the air flow sensor 6 and compared with the demand APC whereafter, if necessary, the position $S\theta$ of the throttle valve 12 is trimmed until the demand APC is achieved. In utilising the invention, some trimming of throttle valve position is likely to be necessary because, in order to obtain a quick response to the driver initiated signal, the throttle valve position $S\theta$ is initially set according to a "coarse" feed-forward position setting which may not necessarily equate precisely with that position setting necessary to provide the required air flow.

As shown in FIG. 3, closed loop controllers such as throttle position PID controller A and air flow PI controller B are used in the control system as would be known to those skilled in the art. However, it will be appreciated by those skilled in the art that other suitable controllers could also be used, if desired.

As alluded to hereinbefore, the degree of correction to the initial throttle position $S\theta$ may be maintained at a minimum by configuring the system such that a relationship between the throttle valve position and the demand air per cycle is appropriately derived for any given point in time and set of engine operating conditions. As such a relationship is likely to be time variant, it may be refined over time by storing values for throttle position $S\theta$ and measured APC and relating these values to obtain minimum error in the initial coarse setting $S\theta$ of the throttle valve 12. Again, as described above, the relationship can take into account engine operating conditions (eg. engine speed and load), other parameters such as atmospheric temperature and pressure, and pedal position to provide a look-up map which will generate the required throttle valve position $S\theta$ for any particular engine operating condition, other specified parameter and pedal position during the life of the engine. In this way, the degree of over-compensation or under compensation obtained from the initially selected throttle position $S\theta$ can be reduced as can the response lag as a consequence of reducing the number of iterations required to obtain an acceptable measured APC which corresponds to the demand APC as determined by the ECU 17.

In this regard, such an adaptive control system would operate almost entirely as described hereinbefore. The throttle valve servo motor 5 is actuated such that the throttle valve 12 is moved to the initial position as determined by the ECU 17 with the throttle position feed-back loop effecting any necessary adjustments to the throttle position setting. The actual rate of air flow is then measured and compared with the demand APC which is also set by the ECU 17 in accordance with the fuel demand and engine speed. The resulting error A between the demand APC and actual or measured APC is then input to the ECU 17 which calculates the next value for throttle valve position. Thus an iterative process is initiated which continues until the error A is reduced to an acceptable value.

Referring again to the adaptive nature of the hereinbefore described control system, the look-up map can be modified on the basis of error A such that the values for initial throttle setting therein reduce the error A to the least possible value, hence avoiding loss in accuracy of air flow and/or response time in conducting the iterative process discussed hereinabove. In this sense, the control method and system of the present invention is robust to changes in engine operating conditions which occur during the life of the engine and which may result from leaks of air into the air intake system which could detrimentally affect control of air flow unless compensated for by the ECU 17.

In a further variant of the present invention, the ECU 17 can be configured with a diagnostics mode which informs a manufacturer or user of faults in an engine, for example, engine operation, performance and components in the air induction system. As alluded to hereinbefore, the presence of such faults becomes apparent upon a comparison of the initial or feed-forward settings determined by the ECU 17 with those reached by way of the aforementioned feed-back control loops of the air flow control system. Hence, the difference between the initial or feed-forward throttle position settings and/or related air flow values as compared with the actual values achieved by way of the feed-back control loops can be used to flag an error. For example, much lower values of throttle position setting than would be expected in comparison with the initial coarse throttle position setting may indicate leaks into the air induction system. Other faults such as problems with the air flow sensor 6 or inaccuracies with the throttle position feed-back means may also be determined by such a diagnostics mode of the control system.

The diagnostics mode can be made to be complementary with an adaptive mode of the control system in that a certain range of values may be allowed for adaptation of the system over time. However, should the modified or corrected values fall outside this range, an error will be flagged which can be acted upon as is necessary.

Finally, in a further variant of the present invention, the ECU 17 can be configured to operate in a "limp-home" mode in the event of a fault or problem affecting the air induction system. In particular, if the air flow sensor 6 was to become inoperable, sufficient control over the air induction system would be possible to continue engine operation. In this regard, the control system would simply rely upon the initial feed-forward setting of the throttle means and the feed-back on the position setting of the throttle means to enable the provision of a required air flow to satisfactorily operate the engine. Such a "limp-home" system would be able to provide an actual air flow in the air intake passage 11 sufficiently close to the demanded air flow to enable the vehicle driver to continue driving the vehicle until necessary maintenance or repair thereto is carried out.

The claims defining the invention are as follows:

1. A method of controlling the air supply to an internal combustion engine having a means to throttle the air flow to the engine comprising:

determining the air demand in response to a driver initiated signal;

determining an initial position of said throttle means in response to the driver initiated signal;

determining the actual rate of air supply to the engine and comparing said actual rate of air supply with said determined air demand;

moving the throttle means to said initial position; and adjusting the position of the throttle means to bring the actual rate of air supply within acceptable operating limits of said determined air demand.

2. The method of claim 1 wherein the position of the throttle means is compared with a set point position value and a throttle position actuator is actuated when an actual throttle means position value differs from said set point position value by a greater than acceptable margin to bring said actual position and said set point value into a closer alignment.

3. The method of claim 1 wherein said initial position of said throttle means is provided by a look-up map within an engine control unit in accordance with said driver initiated signal.

4. The method of claim 1 wherein said initial position is an acceptable range of position values.

5. The method of claim 1 wherein said driver initiated signal is an accelerator pedal position.

6. The method of claim 1 wherein said initial position of said throttle means is compensated for changes in engine operating conditions and parameters enabling said initial position of the throttle means to more closely approximate the position corresponding to said determined air demand of the engine over time.

7. The method of claim 6 wherein said initial position of said throttle means is compensated for engine to engine variations.

8. The method of claim 6 wherein said engine operating conditions and parameters include engine speed, engine load, air intake temperature and air intake manifold pressure, atmospheric temperature and atmospheric pressure.

9. An internal combustion engine control system comprising:

at least one air intake passage through which air flows to the engine;

first control means located in said at least one air intake passage and being operable to vary the rate of air flow through said at least one air intake passage;

measurement means for determining an actual rate of air flow through said at least one air intake passage; and second control means operable to determine an air and/or fuel requirement of the engine in response to a driver initiated signal;

characterised in that the second control means also determines an initial setting for said first control means upon determination of the air and/or fuel requirement of the engine; said actual rate of air flow is measured by said measurement means and compared with said determined air requirement, the setting of said first control means being controlled by the second control means such that said actual rate of air flow is adjusted to within acceptable operating limits of the determined air requirement.

10. The system of claim 9 including a control loop wherein an actual setting of said first control means is compared with a set point setting and the first control means is adjusted when said actual setting differs from said set point setting by a greater than acceptable margin to bring said actual setting and said set point setting into closer alignment.

11. The system of claim 9 wherein said second control means determines an initial setting for said first control means upon determination of the air and/or fuel requirement of the engine.

12. The system of claim 9 wherein said initial setting is an acceptable range of throttle position values.

13. The system of claim 9 wherein said initial setting of at least one of said first control means and said third control means is provided by a look-up map within said second control means in accordance with said driver initiated signal.

14. The system of claim 9 wherein said driver initiated signal is an accelerator pedal position.

15. The system of claim 9 wherein said first control means is a throttle valve.

16. The system of claim 9 wherein said at least one air intake passage includes a further air intake passage.

17. The system of claim 16 wherein said first control means is located in said further air intake passage.

18. The system of claim 16 wherein the further air intake passage includes a third control means controllable by said second control means such that a rate of air flow through said further air intake passage is maintained within predetermined limits.

19. The system of claim 18 wherein said second control means determines an initial setting for said third control means upon determination of the air and/or fuel requirement of the engine.

20. The system of claim 19 wherein said initial setting of a control means is compensated for changes in engine operating conditions and parameters enabling said initial setting to more closely approximate the setting corresponding to said determined air requirement of the engine over time.

21. The system of claim 20 wherein said initial setting of said throttle means is compensated for engine to engine variations.

22. The system of claim 20 wherein said engine operating conditions and parameters include engine speed, engine load, air intake passage temperature and air intake passage pressure, atmospheric temperature and atmospheric pressure.

23. A method of diagnosing faults in an engine air intake system comprising at least one air intake passage through which air flows to the engine;

first control means located in said at least one air intake passage and being operable to vary the rate of air flow through said at least one air intake passage; and second control means operable to determine an air and/or fuel requirement of the engine in response to a driver initiated signal;

wherein said second control means also determines an initial setting for said first control means upon determination of the air and/or fuel requirement of the engine;

said actual rate of air flow is measured by said measurement means and compared with said determined air requirement, the setting of said first control means being controlled by the second control means such that said actual rate of air flow is adjusted to within predetermined limits of the determined air requirement characterised in that said initial setting is updated in accordance with engine operating history and stored within a look-up table, said updated setting in said look-up table being compared with said initial setting to determine the occurrence of faults within said engine air intake system.

24. The method of claim 23 wherein, upon diagnosis of a fault within the engine, the air flow to the engine is controlled in accordance with an initial setting for said first control means as determined in response to said driver initiated signal and the setting of said first control means is compared with a tabulated setting applicable to said air and/or fuel requirement of the engine and adjusted when said actual setting of said first control means differs from said tabulated value by a greater than acceptable margin to bring said actual setting and said tabulated setting into closer alignment.

\* \* \* \* \*